UNITED STATES PATENT OFFICE 2,061,194

METHOD OF RECOVERING COPPER FROM WASH SOLUTIONS

Sverre Gulbrandsen, Woodbury, N. J., assignor, by mesne assignments, to New Process Rayon, Inc., a corporation of Delaware No Drawing. Application February 23, 1932, Serial No. 594,751

2 Claims. (Cl. 23—125)

This invention relates to a method of recovering copper from waste wash solutions such, for example, as obtained in the manufacture of cupro-ammonium rayon.

The primary object of the invention is to recover the copper in a simple and effective way and in a desirable state or form.

The invention will be described in connection with wash solutions obtained in the manufacture of cupro-ammonium rayon. For illustrative purposes a spinning solution may be prepared in about the following proportions, 300 pounds of cotton linters, 150 pounds of copper hydroxide and 900 pounds of 26° Baumé ammonia water, to which is added sufficient water to bring the concentration of cellulose to the desired point. This solution is spun into a caustic soda precipitating bath. The thread is drawn from the bath and laid onto a cage-like drum in the form of a helix advancing along said drum. Acid is dripped onto the revolving drum at two points, one near the end on to which the thread from the bath comes and the other somewhere near the middle of the cage, lengthwise considered. The second acid drip is followed by a water drip. The cage is preferably inclined and the liquids run toward the oncoming thread end and drop off into a collecting pan or other vessel. The two acid drips may be of approximately equal strength, each say 15 grams per liter.

The wash solution collected contains the copper dissolved in the form of sulphate and in a high state of dilution, e. g., .2 to .5% copper sulphate. It also contains some ammonium sulphate and sodium sulphate. In addition it may contain a very slight excess of free sulphuric acid, or it may be very slightly deficient in sulphuric acid so that a very small portion of the copper may be in the form of a basic sulphate precipitate suspended in the solution. The aim is to use just enough sulphuric acid in the washing process to bring all the copper into solution as normal sulphate, and such a solution may be considered typical; however slight deviations may occur above or below this amount, as noted above, but this does not affect the working of the process.

It is known that copper sulphate is hydrolyzed in solution and gives an acid reaction to litmus. Expressed in terms of pH units, the typical solution described above has a pH test of about 5, varying slightly above or below this figure if there is a deficiency or excess of sulphuric acid.

It is known that copper may be precipitated as basic sulphate from such a solution by the addition of an alkali, such as caustic soda. The precipitation is substantially complete when enough alkali has been added to bring the pH up to about 7. However, the precipitate so obtained is gelatinous, bulky, difficult to filter and, therefore, undesirable from an operating standpoint.

The basis of the present invention in part lies in the discovery that a dense granular precipitate of basic copper sulphate is obtained if the precipitation by alkali is conducted in two or more stages with a time interval between the stages. Such a precipitate may be only one-twentieth to one-fiftieth as bulky as that obtained by the single stage precipitation; moreover, on account of its granular structure, it filters very readily and forms a very dense filter-cake.

In practice, the two stage precipitation has been found to be satisfactory, though my process covers any multiple stage precipitation.

No definite limit can be put on the proportion of copper precipitated in each of the two stages, but in general I prefer to precipitate 50 to 75% of the copper in the first stage, and the remainder in the second stage. The proper amount of alkali to be added for this purpose may be controlled by pH tests of the solution in which the precipitation is being made. As an example, the alkali may be added in the first stage so as to keep the pH between 5.8 and 6.2, though I do not confine myself to these exact limits. In the second stage the pH is brought up to about 7.

Caustic soda is the preferred form of alkali which I use, but any equivalent alkali is understood to be covered.

The following description is cited as one method by which my process may be operated in practice:

The precipitation is carried out in two tanks provided with agitators, the first overflowing into the second. The contents of these tanks are kept continually agitated.

The wash solution flows in a continuous stream into the first tank and enough caustic soda solution is fed in so that the desired proportion of the copper is precipitated. This is controlled by pH tests of the liquid, which should preferably be 5.8 to 6.2.

The liquid containing the precipitate in suspension flows continuously into the second tank where the caustic soda solution is fed in at the proper rate to complete the precipitation, which rate can be controlled by keeping the pH of the solution at about 7.

From the second tank, the liquid containing the precipitate in suspension overflows into a settling tank provided with baffles where the precipitate settles and the clear waste liquid flows out at the other end. Periodically the precipitate is pumped out from the bottom of the settling tank and filter-pressed.

In this manner a simple, efficient and continuous process is provided for recovering the copper in a dense, easily filterable precipitate, of a high copper content.

The basis of this process more importantly lies in the discovery that when basic copper sulphate is precipitated from the wash solution under acid conditions (pH appreciably below 7), the precipitate is obtained in a dense granular form, whereas if the precipitation is conducted under neutral conditions (pH about 7), a bulky, gelatinous precipitate is formed. When the operation is conducted in two stages, where a large portion of the copper is precipitated in the first stage, it appears that the precipitate which forms in the second stage patterns itself after the first stage precipitate. At all events it is all dense and granular.

Some time interval between the two stages seems to be desirable to give the best results, and this is provided by having the precipitation tanks large enough so that the solution and precipitate remain therein a sufficient length of time to give a precipitate of the most desirable properties.

It is obvious that it would be within the scope of my invention to recover the bulk of the copper in one precipitation under acid conditions, the rest being either wasted or recovered in some other way.

I claim:—

1. The process of recovering copper in the form of a dense granular basic sulphate from wash solution obtained in the cuproammonium rayon process, which comprises flowing the wash solution in a continuous stream into a first tank while feeding into said tank and agitating with the wash solution sufficient caustic soda in proportion to the amount of copper salt in the solution and the acidity of the solution to precipitate 50 to 75 per cent of the copper content of the mixture as basic copper sulphate while continuously overflowing the mixture of all the precipitate thus formed with the unprecipitated solution from the first tank into a second tank, feeding into the second tank and agitating with the contents thereof sufficient caustic soda to complete the precipitation, while overflowing the mixture from the second tank into a settling tank, overflowing the supernatant liquid from the settling tank and removing the entire precipitate in the form of a dense granular basic sulphate of copper from the bottom of the settling tank.

2. The process of recovering copper in the form of a dense granular basic copper sulphate from a relatively weak solution of copper sulphate in the form of a wash solution obtained in the cuproammonium rayon process, the wash solution containing not more than .2 to .5 per cent copper sulphate in solution, which comprises continuously carrying out the precipitation in separate stages, each stage in a separate tank, substantially less than the entire copper content being precipitated in the first stage in one tank and the remainder of the copper content being precipitated on to the previously formed precipitate in subsequent tanks, and removing the total precipitate in the form of dense granular basic copper sulphate.

SVERRE GULBRANDSEN.